United States Patent [19]

Gross et al.

[11] Patent Number: 5,083,270

[45] Date of Patent: Jan. 21, 1992

[54] METHOD AND APPARATUS FOR RELEASING VALUE OF AN ASSET

[75] Inventors: Hyman Gross, New York, N.Y.; Melvin J. Hatcher, Cambridge; Jonathan R. P. Checkley, London, both of United Kingdom

[73] Assignee: Interforce, Ltd., England

[21] Appl. No.: 628,938

[22] Filed: Dec. 14, 1990

Related U.S. Application Data

[63] Continuation of Ser. No. 534,361, Jun. 7, 1990, abandoned, which is a continuation of Ser. No. 441,222, Nov. 27, 1989, abandoned, which is a continuation of Ser. No. 267,688, Nov. 2, 1988, abandoned, which is a continuation of Ser. No. 10,450, Feb. 3, 1987, abandoned.

[51] Int. Cl.$^5$ .............................................. G06F 15/20
[52] U.S. Cl. ..................................... 364/408; 364/401
[58] Field of Search ............... 364/408, 406, 407, 400, 364/900

[56] References Cited

U.S. PATENT DOCUMENTS 4,876,648  10/1989  Lloyd .................................. 364/408

OTHER PUBLICATIONS

S. S. Heubner, Life Insurance, Appleton, Century Cross, New York, 4th ed. 1950, pp. 212-221.
R. Riegel et al. Insurance Principles and Practices Annuities and Special Contracts, Englewood Cliff, N.J., 1966, pp. 147-153.
A. Neill, Life Contigencies; Heinemann London 1977 pp. 41-43.
Stalwart Assurance Company, Limited, "How to Turn Your Home into an Income for Life", Sep. 1985, pp. 1-9.
"Income Plans for the Elderly-Sitting on an Asset", Planned Savings, Feb. 1986, pp. 70-77.
J. Gaselee, "Home Reversions", The Post Magazine and Insurance Monitor, Feb. 1986, pp. 16-17.
Fact Sheet—Home Equity Conversion, p. 1.
Fact Sheet on Home Equity Conversion, p. 1.
Sotheby's "Works of Art for Membership of Lloyd's", pp. 1-9.

Primary Examiner—Dale M. Shaw
Assistant Examiner—Xuong M. Chung
Attorney, Agent, or Firm—Samuels, Gauthier & Stevens

[57] ABSTRACT

A data processing method and system for implementing a program to produce income from assets not normally income-producing, or to increase income from assets that already produce some income, is provided. According to the program, an interest-free mortgage is taken against the asset as security for a promissory obligation by a participant to pay a sum certain on his death. The promissory obligation becomes part of a fund which derives income through payment of such obligations as participants die, funding distributions to other participants still living. The data processing method and system of the invention determine eligibility, calculate distributions, monitor the value of the pledged assets with respect to the amounts against which they are pledged, and handle discharge of the obligations as participants die.

18 Claims, 7 Drawing Sheets

METHOD AND APPARATUS FOR RELEASING VALUE OF AN ASSET

This is a continuation of copending application(s) Ser. No. 07/534,361 filed on Jun. 7, 1990, now abandoned, which is a continuation of Ser. No. 07/441,222 filed Nov. 27, 1989, now abandoned, which was a continuation of Ser. No. 07/267,688 filed Nov. 2, 1988, now abandoned, which was a continuation of Ser. No. 07/010,450 filed Feb. 3, 1987, now abandoned.

BACKGROUND OF THE INVENTION

This invention relates to a data processing method and system for releasing the value of an asset. More particularly, this invention relates to a data processing method and apparatus for administering a program for making available in cash form to the owner of an asset at least part of the value of the asset. The invention thus enables production of income from assets that are not normally income-producing, or the increase of income from assets that already produce some income.

Many types of assets—e.g., homes, works of art, precious metals and gems—fluctuate in value over time. Most of the time, these assets, particularly homes and works of art, increase in value over time. However, while this increase in value results in an increase of the net worth of the owner of the asset, the owner cannot actually gain access to his increased wealth without disposing of the asset. For some types of assets—e.g., precious metals—which are not held for enjoyment, this does not present any difficulty. However, for an asset held to be enjoyed, especially a home, it is impractical to dispose of the asset to gain access to its increased value.

There are a number of annuity-type schemes on the market intended to resolve this situation. However, some require immediate transfer of ownership, so that, if the asset is a home, one must become a tenant in one's own home. Others base the annuity on substantially discounted mortgage proceeds.

It would be desirable to be able to provide a program whereby the owner of an asset can gain access to the value of the asset without relinquishing ownership or control of the asset during his lifetime.

SUMMARY OF THE INVENTION

It is an object of this invention to provide a program whereby the owner of an asset may gain access to the value of the asset without relinquishing ownership or control of the asset during his lifetime.

In accordance with this invention, there is provided a data processing system and method for administering a program for releasing to an owner of an asset at least a portion of its cash value without transfer of ownership of said asset and without transfer of control thereof. The system and method determine eligibility for the program and determine program payouts. In accordance with the data processing system and method of the invention, application data derived from an application are entered. The application data include date of birth of the owner, an amount of a promissory obligation to be offered by the owner for participation in the program, and an estimate by the owner of the current market value of the asset. The probability of the death of the owner in any given year is determined based on the date of birth. Based on the current market value and the probability of the owner's death, a determination is made as to whether or not the asset will support a predetermined minimum periodic distribution of cash, and the application is rejected if the value of the asset is too low. If the application is not rejected, a mortgage document and a promissory note are generated for signing by the owner. The promissory note is secured by the mortgage and is payable on the death of the owner. Periodic distributions are made to each participating owner based on the value of particular assets and the amount of the promissory obligation given by each owner. The owner thereby retains ownership and control of the asset during his lifetime while the value of the asset is available to him as cash.

BRIEF DESCRIPTION OF THE DRAWINGS

The above and other objects and advantages of the invention will be apparent upon consideration of the following detailed description, taken in conjunction with the accompanying drawings, in which like reference characters represent like parts throughout, and in which.

DETAILED DESCRIPTION OF THE INVENTION

Figure 1A:
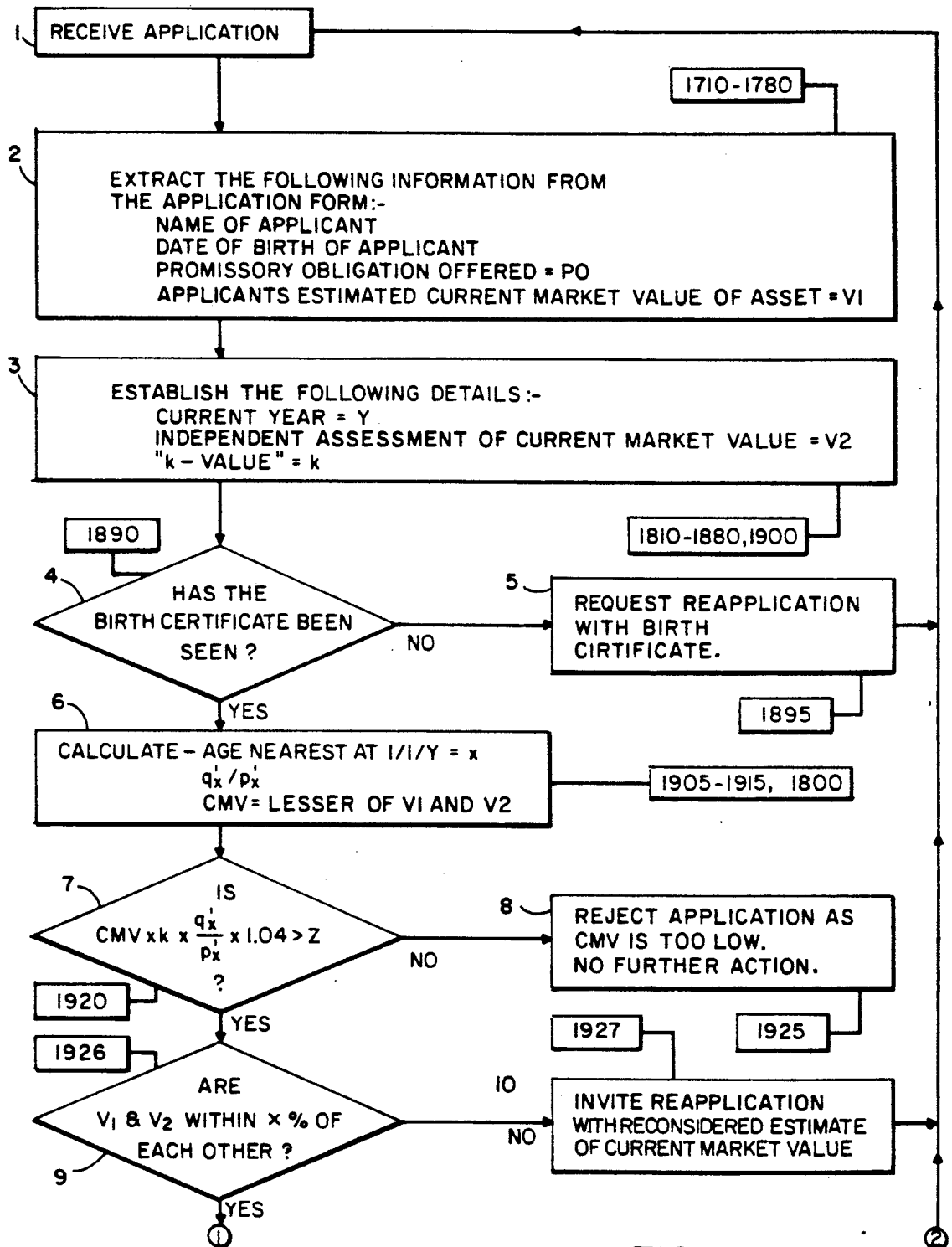
FIGS. 1A–1B are a flowchart diagramming the application and entry phase of the system and method of the invention.

The present invention is a data processing system and method for implementing a program for producing income from assets that are not normally income-producing, or increasing the income from assets that already produce some income. As the value of the asset increases, the income can increase as well, as discussed below, and the invention thus can serve as a device to protect against the effects of inflation. The invention may be used as the basis of many different financial services, including annuities, individual pension plans, payment of health or other insurance premiums, interest-free loans, and investment funds, to be discussed more fully below.

Various possible assets can be used in implementing the invention including homes, income-producing real estate, works of art, precious metals, life insurance policies, death benefits under pension plans, and marketable securities.

The program implemented by the invention works in the following way. An asset serves to secure a promissory obligation to pay a designated amount, and that amount is payable upon the death of the person who makes the promise. No money or property changes hands during the person's lifetime. The promissory obligation is secured by a standing mortgage against the asset, or (depending upon the nature of the asset) by some other security device that is suitable to secure the promised payment. The mortgage or other security device serves only to secure the promissory obligation and is not intended as an income-producing device for the program. However, because interest paid on home mortgages may be tax-deductible, it may be desirable to have such mortgages bear interest at a variable rate that matches the amount to be added to accumulated reserves (discussed below), with such interest withheld from distributions and added to the accumulated reserves. When the person dies, his promise to pay the designated amount is performed by his estate, and the mortgage or other security device, hereafter referred to as a mortgage, is then terminated.

The promise is made to an entity that manages a fund, and the person who makes the promise is a participant in the fund. The fund consists of the secured promissory obligations, and of amounts of cash representing payments of the promissory obligations by the estates of those persons who have made such promises and have subsequently died. The amounts of cash are held by the fund pending periodic distribution, as described below, to those participants in the fund who are still living. The cash awaiting distribution may also be invested by the fund.

Assuming that there are no great eccentricities in the composition of the fund, a fund with 5,000 members should be safe from a statistical point of view. In theory undesirable distortions are possible, but in practice only very broad limits on the composition of the fund need be imposed. What must be avoided is a fund whose expected distributions are unattractively small because of an extraordinarily large number of relatively young participants, or a serious distortion caused when the amounts committed by participants who are relatively young are unduly large when compared to the amounts committed by relatively older participants. But the fund can tolerate a considerable range of age/amount variation without difficulty, and can provide age/amount limits (adjustable from time to time if necessary) to avoid distortion.

An anti-windfall provision is desirable to dispel the unattractive prospect of a relatively large amount being paid out of a participant's estate after only a relatively small amount has been received by a participant who dies much sooner than actuarial expectations would indicate. Such protection can be provided to a participant (perhaps to be offered on an optional basis) by life insurance for, e.g., the first three-years of his participation so that his estate would receive as insurance proceeds, e.g., 75% of the amount of the promissory obligation if the participant dies during the first year, 50% if within the second year, and 25% if within the third year. The premium for such insurance would be deducted from the distribution payments during the period of coverage. Such insurance protection might also be expected to moderate the effect on the fund of the selection factor discussed below.

The program implemented by the invention can be based on more than one life so that, for example, a husband and wife can both continue to enjoy the asset for life, and the survivor will continue not only to enjoy the asset but will continue to receive distributions as long as he or she lives, perhaps at a different level. Special calculations regarding life expectancy will be necessary.

The amount available for distribution to participants for each period is the total amount of the promissory obligations paid during the period, plus earnings on invested funds, if any, less administrative costs and management charges. However, not all of the money available for distribution each period need be paid out to the participants as the fund may wish to accumulate reserves, or make additional investments.

An initial amount of capital, to fund the first payouts until a sufficient stream of settled promissory obligations is established, may be needed. People who enter as participants will believe they have quite a few years of life ahead of them. Few participants will die very soon after joining a fund simply because most people have some idea not long before they die that there is a good chance of their dying, and most people who do not believe there is any particular likelihood of their dying soon are generally proved to be right. This means that a fund is likely to start off with participants whose life expectancy is somewhat greater than the statistical average for their age as shown in standard actuarial tables. Annuity plans generally are subject to this same statistical deviation, which is known as the selection factor. The program implemented by the invention therefore has the choice of simply riding out an initial period of reduced proceeds and distributions to participants, or of undertaking to pay as distributions particular amounts as a minimum. The latter course may well be thought necessary because of marketing considerations, in which case there is the question of what initial capital is necessary to finance such distributions. Since only the shortfall attributable to the selection factor need be financed, estimates can be based on annuity fund experience. Using standard (U.K.) mortality tables for annuitants, the "select period" lasts for one year and indicates that the mortality is approximately 60% of the population at large (up to age 75). Estimates of capital for this initial financing can be made with the selection factor in mind.

The alternative to capital from outside the fund can be devised by paying reduced distributions to participants for, e.g., the first five years of their participation. The desirability of such a self-financing scheme will depend upon whether such reduced distributions are sufficiently attractive from a marketing point of view. Self financing can be accomplished by making distribution payments to participants during the first five years of their membership in the fund at, e.g., the rate of 50% the first year, and increasing in equal amounts over the next five years to 100%. Other schedules of reduced payments might also be used.

However, in the preferred embodiment of the invention, described below, a minimum distribution is always made, and the fund is started with outside capital. Recapture of amounts required for initial financing will of course be a consideration in determining the amounts to be withheld from distributions by the fund management, either as part of the management charge or in connection with the reserve scheme, both discussed below.

The fund can be run simply as a redistribution scheme in which the proceeds of promissory obligations are distributed to participants according to their shares after stipulated administrative and management charges are deducted. In that case, participants will have to be informed on entering into the program that expectations will vary depending on the composition of the fund with reference to average age, number and age of entrants each year, and the amounts of promissory obligations for each age group or for each participant individually, and the experience of the fund.

Alternatively, the fund can commit itself to paying a particular amount as a minimum, or it can commit itself to paying a fixed amount that it deems safe from an actuarial point of view. Either of these alternatives can be embellished with a bonus provision (discussed below) that offers the prospect of bonus distributions in addition to normal distributions in case the accumulated reserves (discussed below) are in excess of a stipulated amount.

It would seem that plans incorporating some commitment to definite amounts of distribution by the fund would be more attractive to participants, especially if bonus and other favorable prospects are made clear. If the commitments are based on suitable conservative actuarial calculations the risks to the fund should be very small.

In the preferred embodiment, the share in distributions to which each participant is entitled is determined based upon the amount of the promissory obligation furnished by the participant, and upon the probability of the participant's death within the year according to a formula, forming part of the invention, which relies on mortality statistics. The amounts that each participant would receive would normally increase steadily with the passage of time, with much larger amounts at a more advanced age in accordance with reduced statistical life expentancy. The amount of the promissory obligation may also be increased as the value of the asset that secures it increases, and this would also increase the amount that a participant receives.

It is desirable and preferable for the fund to retain and accumulate as a reserve some portion of the amounts available for distribution. The reserve would serve to cushion any lower than expected proceeds for a given period so that distributions could be maintained at the stipulated level without difficulty. It could also provide the money for attractive bonus distributions to be made from time to time when the reserve reaches a certain predetermined point.

It may seem at first that the program implemented by the invention has the effect of depriving heirs of some of what they would normally inherit In fact, it may be used to achieve just the opposite by providing a mechanism that allows one to give one's children and grandchildren money that they want or need now, without in any way depriving oneself of any of the resources upon which one depends for the rest of one's life. In addition to being able to help one's family now when such help is needed, the effect of such an arrangement is to reduce one's taxable estate at death, insofar as the fund stands as a creditor of the estate to the extent of the promissory obligation.

A computer program, written in IBM ® BASIC, that is used in a preferred embodiment of the system and method of the invention to implement the program is attached as an Appendix. Various steps carried out in a preferred embodiment of the system and method of the invention are diagrammed in the flowcharts of FIGS. 1A–4, which are keyed by line number, where appropriate, to the BASIC listing in the Appendix.

Figure 1B:
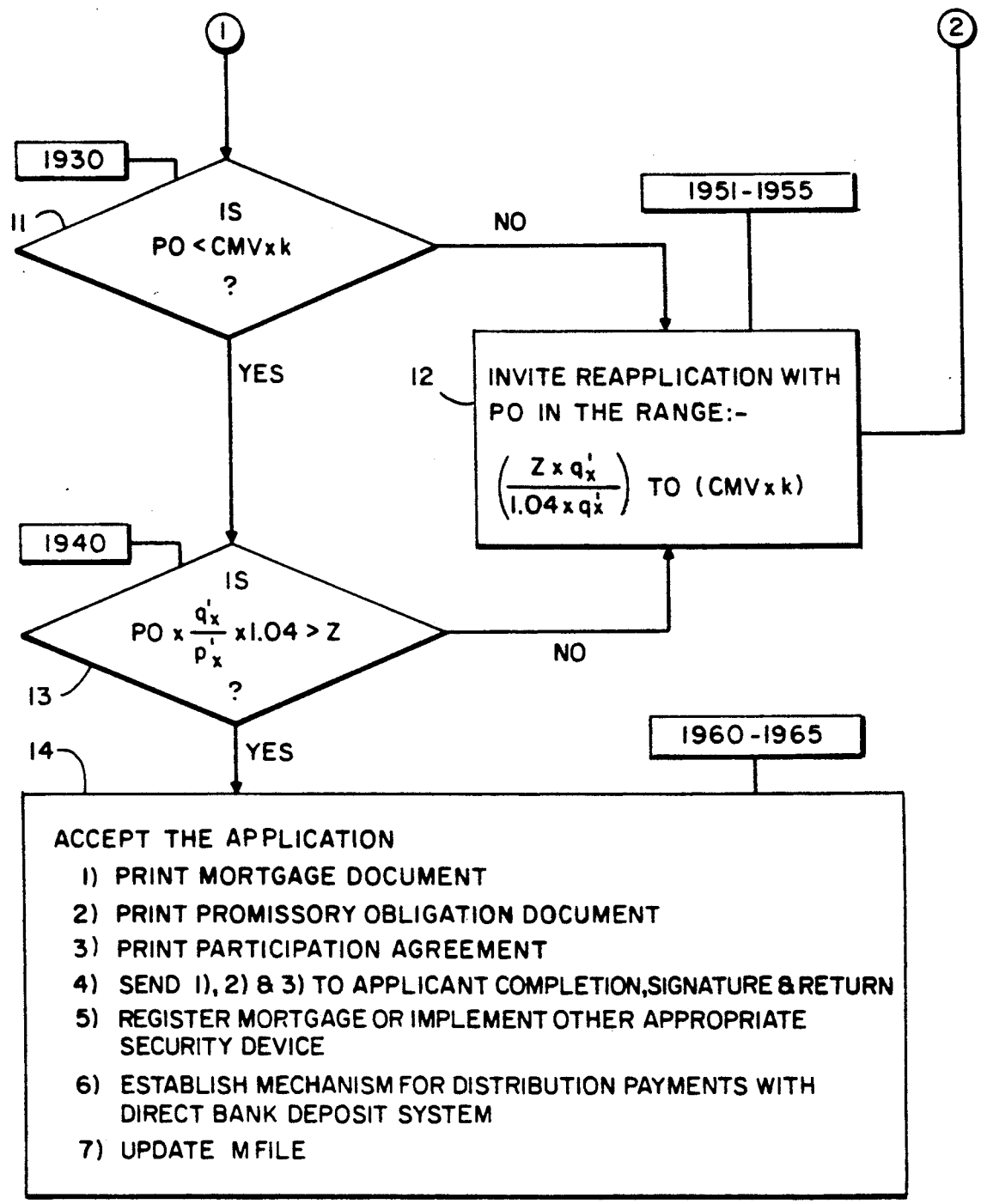

The processing of a potential participant's application to join the program is diagrammed in FIGS. 1A–1B. An application is received at 1. The application contains several items of information, including applicant's name and date of birth, the amount of promissory obligation offered, the type of asset, and applicant's own assessment of the current market value of the asset. These items are entered into the system at 2. Other data asked for in the application, but which may not be used in the eligibility determination, are address, sex and marital status of the applicant, further identification of the asset and any existing prior liens or other charges against the asset. At 3, the current calendar year is entered into the system, either manually or from an internal clock in the system hardware (described below). Also entered is an independent assessment, obtained by program personnel from an independent appraiser, of the current market value of the asset. Finally at 3, a proportionality factor ("k-value") is entered. The proportionality factor depends on the type of asset and is derived from a list of proportionality factors for different types of assets that is maintained by the system. The proportionality factor takes into account possible fluctuations in the value of the asset and is the ratio of the lowest normally expected value of the asset over the lifetime of its owner (the participant) to its present value. At 4, the system tests to see if the person taking the application has verified applicant's age by viewing his birth certificate. If not, system flow passes to block 5, where applicant is invited to reapply with his birth certificate. Otherwise, applicant's age has been verified and flow passes to block 6 where calculations are made to determine whether or not the asset will support participation in the program by one of applicant's age.

The preferred embodiment of the invention assumes that all participants begin participating on January 1 of any particular year. Thus, at 6, the applicant's age (x) at January 1 of the current calendar year, rounded to the nearest whole-year age, is calculated. Also calculated is the ratio $q'_x/p'_x$ where $q'_x$ is some fraction (e.g., 80%) of the probability of death of one of age x exact according to standard population mortality tables, and $p'_x = 1 - q'_x$. The fraction is chosen so that the periodic distributions are reduced, thus retaining funds within the program to act as a buffer against adverse future contingencies and out of which, assuming all goes at least as well as expected, bonuses can be paid to participants. For example, if the fraction is set at 80%, then 20% of the full theoretical distributions which could have been made are held back. The fraction can of course be varied according to circumstances and experience. Current market value (CMV) is set to the lesser of applicant's assessment of current market value and the independent appraisal.

A minimum periodic distribution of Z dollars is set by the program managers so that very small cases, which may not be worth the administrative expense of handling, are not accepted for participation in the program. At 7, the system tests to see if the value of the asset is sufficient to support such a minimum distribution according to the formula $$CMV \times k \times (q'_x/p'_x) \times 1.04 > Z$$

This test is explained in more detail below in connection with the calculation of distributions. If the value is insufficient, the application is rejected at 8. Otherwise, the value is sufficient and flow passes to test 9 where the system checks that the difference between applicant's assessment of current market value and the independent appraisal does not exceed a predetermined plausible percentage of the independent appraisal. If the difference is excessive, applicant is invited at 10 to reconsider his estimate and to reapply. Otherwise, if there is no excessive discrepancy, flow passes to test 11 where the system checks to see if the promissory obligation offered is less than the product of the current market value and the k-value, so that the asset should always be sufficient to pay off the obligation. If not, applicant is invited at 12 to reapply with a promissory obligation small enough to pass test 11, but large enough to support a minimum distribution of Z. Otherwise, if the promissory obligation offered is not too large to pass test 11, the system tests at 13 to see if it is large enough to support a minimum distribution of Z, using the formula $$PO \times k \times (q'_x/p'_x) \times 1.04 > Z$$

which is the same test used at test 7, except that PO (amount of promissory obligation) is substituted for CMV. If so, the system, at 14, prints the mortgage document, the promissory note, and the participation agreement. The applicant completes the documents, the mortgage is recorded, and the system master file (MFILE) is updated. Optionally, a direct deposit arrangement for payment of distributions may be set up with the participant's bank.

Figure 2A:
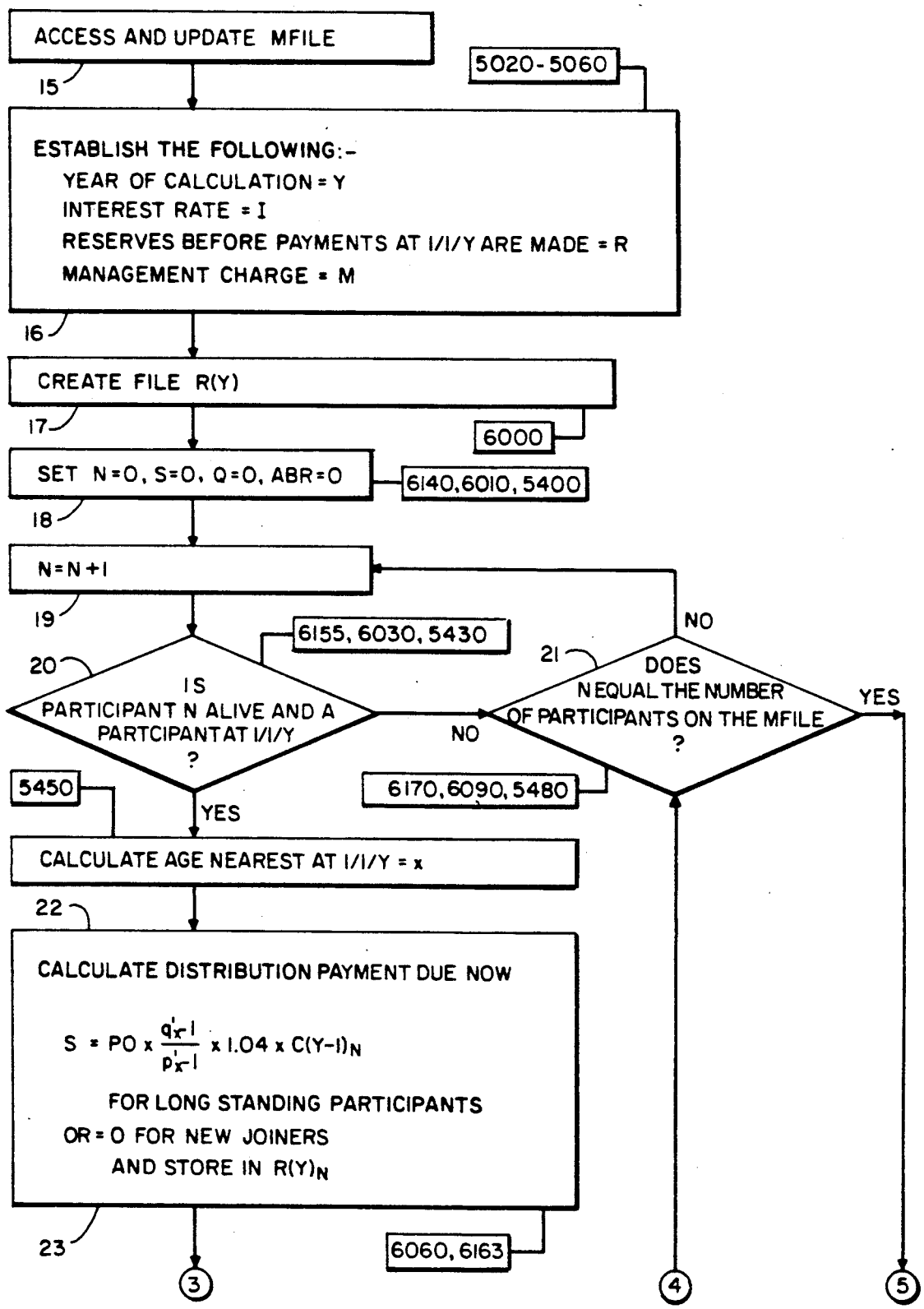
FIGS. 2A–2B are a flowchart diagramming the calculation of distribution payments in the system and method of the invention.
Figure 2B:
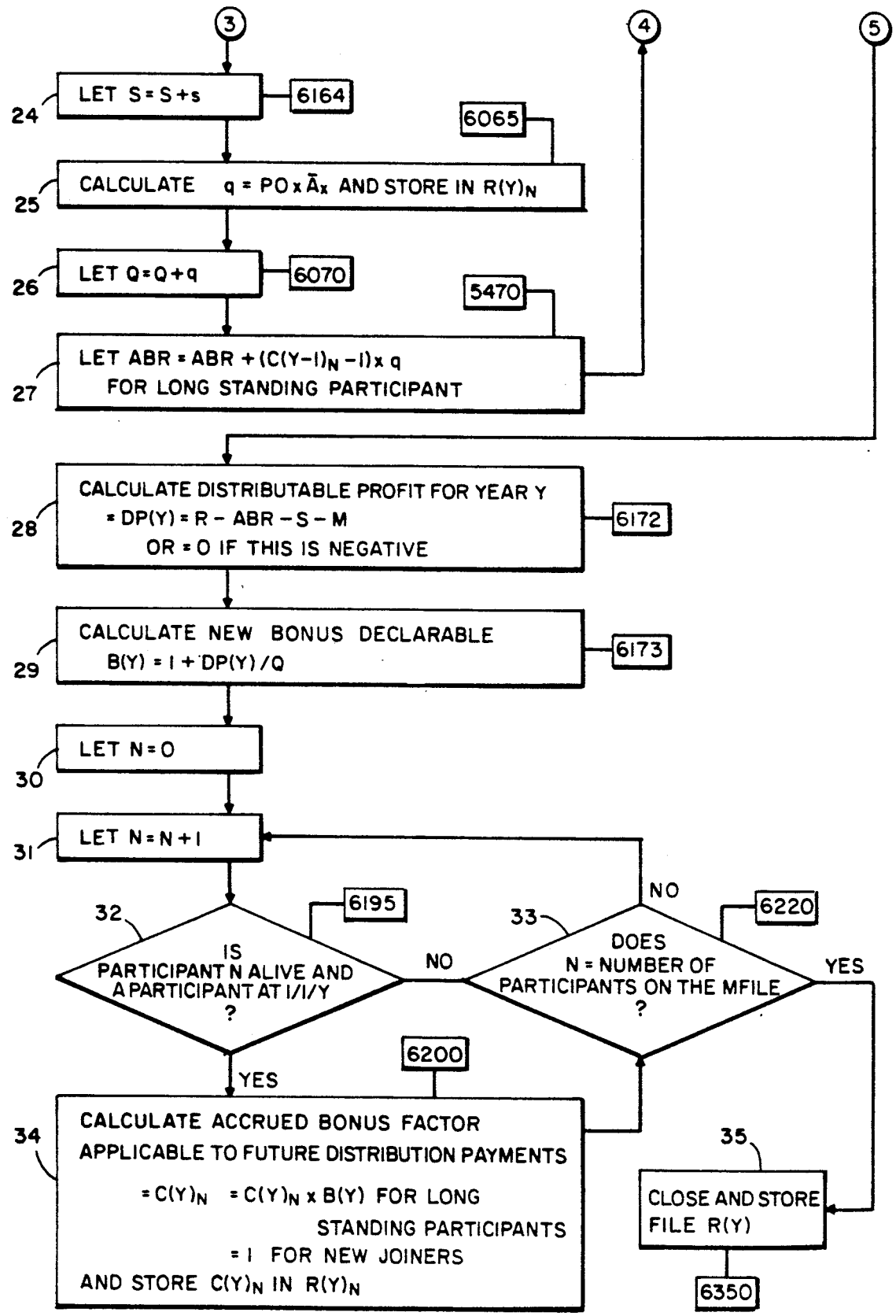
Figure 3:
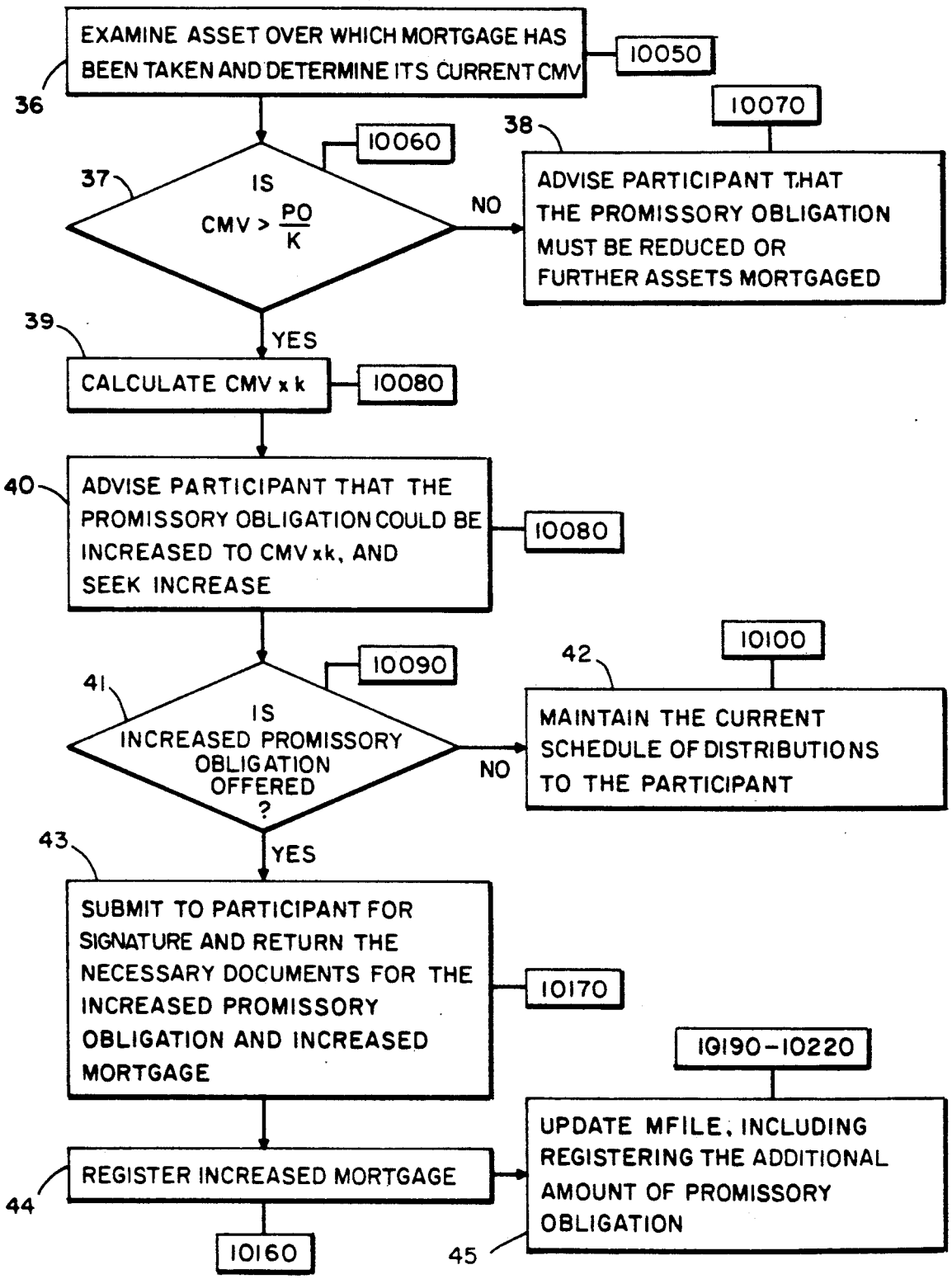
FIG. 3 is a flowchart diagramming a phase of the system and method of the invention in which assets are reappraised and amounts of promissory obligations and mortgages are adjusted accordingly.

The annual calculation of distribution payments is diagrammed in FIGS. 2A-2B. At 15, the system accesses and updates the system master file (MFILE). At 16, the year of calculation (Y), the interest rate (I) (determined from market yields of medium-term high-quality bonds), the available reserves (R) as of January 1 of year Y, and the management charge (M) for the fund (including profit), are entered into the system. At 17, a file R(Y) is created for storing the calculated distributions for year Y. At 18, the variables N (counter for number of participants), S (total distributions for all participants), Q (total of capitalized value of all promissory obligations for all participants), and ABR (accrued bonus reserve—the sum needed to meet all future bonus payments declared to date) are initialized to zero.

At 19, a loop of all participants is begun by increasing the counter N by one. At test 20, the system determines if participant N is alive and was a participant on January 1 of year Y. If not, flow passes to test 21 where the loop is terminated if N equals the total number of participants, or where control passes back to block 19 where N is again incremented. If participant N is alive and was a participant on January 1 of year Y, then at 22 his age at January 1, year Y is calculated to the nearest whole year. At 23, the distribution, s, due participant N is calculated using the formula $$s = PO \times (q'_{x-1}/p'_{x-1}) \times 1.04 \times C(Y-1)_N.$$

The subscript $x-1$ reflects that the calculation covers earnings during the previous year. For that reason, $s=0$ for new participants. s is clearly proportional to the promissory obligation PO and to the risk of death ($q'_{x-1}$) during the year just passed. $p'_{x-1}$ appears in the denominator as a way of giving the participant an added distribution for having survived to the end of the year, which is necessary to receive a distribution. The factor 1.04 allows for interest earned by the fund assuming an annual interest rate of 8% for half a year (because on average, obligations to the fund are paid in the middle of the year). The factor 1.04 can be varied according to circumstances, including prevailing interest rates. $C(Y-1)$ is a factor (always greater than or equal to one) representing the accumulation of all bonuses declared to date, and increases the result thus far obtained to allow for such bonuses. $C(Y-1)_N$ is the factor for an individual participant N. $R(Y)_N$ (referred to in the flowchart) is the Nth entry in R(Y). At 24, s is added to S to keep a running total. At 25, the capitalized value q of the Nth participant's asset is calculated according to the formula $$q = PO \times A_x$$

where $\overline{A}_x$ is the life insurance value to the fund of a participant's promise to pay one dollar on death, applied to the value of the promissory obligation (PO). At 26, q is added to Q to keep a running total. At 27, the accrued bonus reserve (ABR) is incremented for participant N by the product of $(C(Y-1)_N-1)$ and the capitalized value q of his asset. From block 27, control passes back to test 21 to see if all participants have been processed. If not, control returns to block 19. Otherwise, the loop is terminated.

When the loop is terminated, control passes to block 28 where distributable profit for year Y (DP(Y)) is calculated. This figure, which is used to determine if participants are to receive bonuses, is equal to total reserves (R) less accrued bonus reserves (ABR-described above) less total distributions calculated above (S) less the management charge (M) (which includes profit), except that DP(Y) is set to zero if it would otherwise be negative. At 29, a new bonus factor (B(Y)) is calculated as the sum of 1 and the ratio of distributable profit (DP(Y)) to total capitalized value of all assets (Q). At 30, N is reinitialized to zero in preparation for a loop (31-34) in which the accrued bonus factor $C(Y)_N$, for each participant N, for use in the next periodic distribution calculation, is determined. At 31, the counter N is incremented by one. At 32, the system tests to see if participant N is alive and was a participant at January 1 of year Y. If not, the system checks at 33 to see if all participants have been processed and, if they have, the loop is terminated. If all participants have not been processed, the next participant N is processed begining at 31. If, at 32, participant N is alive and participating at January 1, year Y, his new accrued bonus factor $C(Y)_N$ is calculated at 34 as the product of B(Y) and his accrued bonus factor for the previous year $C(Y-1)_N$. For new participants, $C(Y)_N$ is set to 1. Control then passes to test 33 to see if all participants have been processed. If not, the loop continues at 31. Otherwise, the loop is terminated. When the loop is terminated, control passes to block 35 where file R(Y) is closed and stored.

As the value of an asset fluctuates, it may be necessary, to the extent that the fluctuations exceed those predicted by the k-value, to require that the participant reduce his promissory obligation or mortgage further assets, or it may be possible to allow him to increase his promissory obligation. The assets preferably are reappraised periodically by the program and the process of the system and method of the invention for dealing with the reappraisal is diagrammed in FIG. 3.

A reappraisal of current market value is made at 36. At 37, the system tests to see if current market value equals or exceeds the ratio of the amount of the promissory obligation to the k-value. If not, the participant is advised at 38 that he must reduce his obligation or mortgage further assets. Otherwise, if the value exceeds the amount of the promissory note, the participant is advised that he may increase his promissory obligation to the product of the k-value and the new current market value, and he is invited to do so. If, at test 41, he declines the invitation, control passes to block 42 and his distributions remain unchanged. If he accepts, however, the necessary documents reflecting a new promissory obligation and a new mortgage are generated and presented to him for signature at 43. At 44, the new mortgage is recorded. The process ends with the updating of the master file at 45 to include the new promissory obligation.

When a participant dies, the fund must collect the amount of the promissory obligation from his estate. When the asset securing the obligation is something other than real property, the security device used should be chosen to make collection a simple matter. When the asset is real property, provision can be made in the participation agreement for the mortgage to begin to bear interest, as discussed below, when the obligation becomes payable if payment has not been made. The fund would thus receive income for the period of nonpayment, and might even be able to sell the mortgage obligation to interested financial institutions if the agreement provided that the mortgage begins to bear increased interest after an agreed upon period from the time the obligation becomes payable. In a more usual scenario, however, the administrators of the estate would refinance with a conventional mortgage and pay off the obligation to the fund with the proceeds, should there not otherwise be sufficient ready cash in the estate to pay the obligation.

Figure 4:
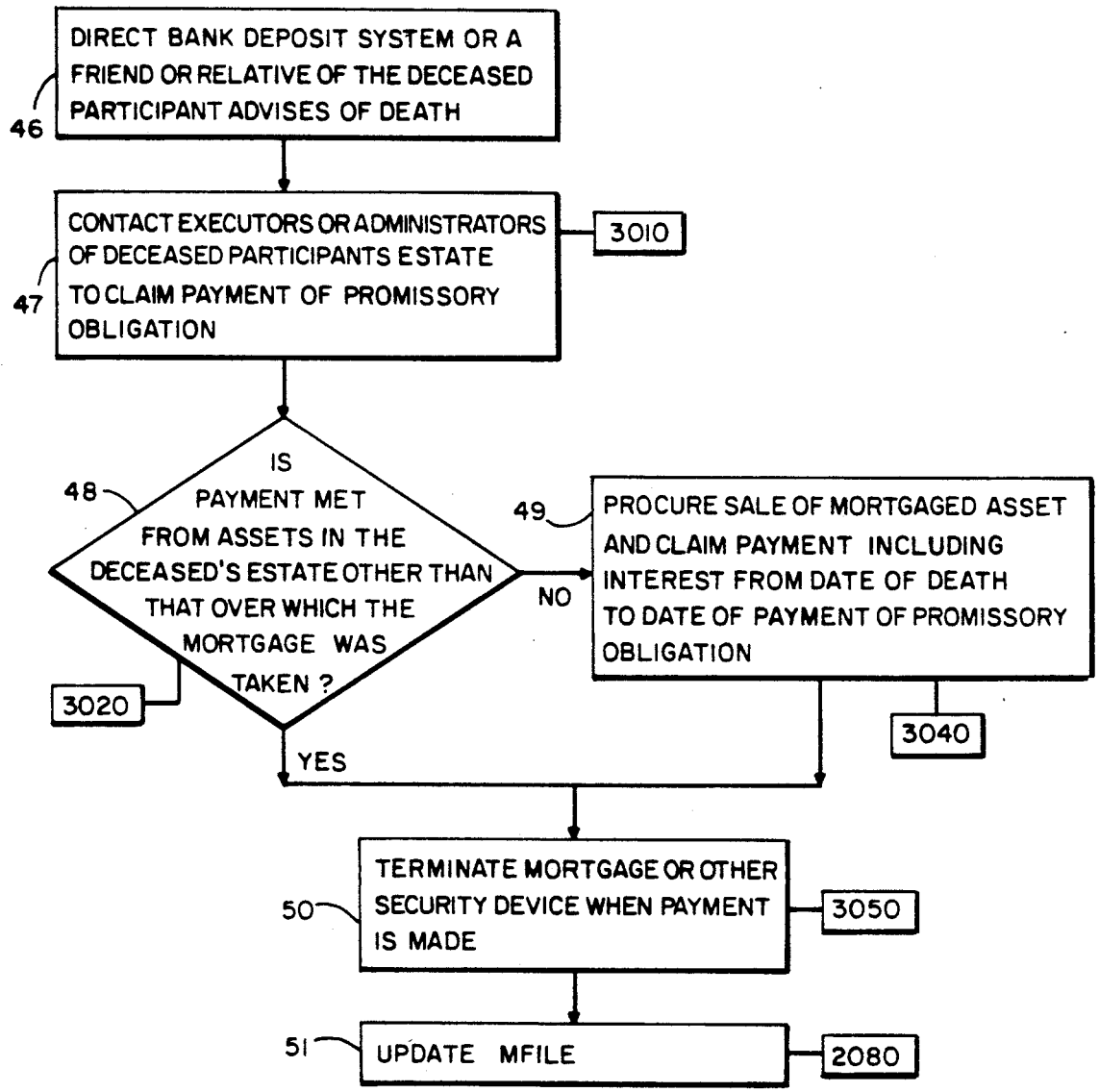
FIG. 4 is a flowchart diagramming the phase of the system and method of the invention in which the promissory obligation is collected upon and the mortgage terminated.

The process for collecting on the promissory obligation on a participant's death is diagrammed in FIG. 4. The process begins at 46 where the program managers are notified of the death by the participant's bank, if direct deposit of distributions is being used, or by a friend or relative of the participant. At 47, the executor or administrator of the deceased participant's estate is contacted and a claim for the amount of the promissory obligation is made. At test 48, the system checks to see if other assets in the estate are sufficient to pay the promissory obligation. If so, the system awaits payment. If not, control passes to block 49 where sale of the assets is procured by program personnel, and the system then awaits payment. At block 50, the system accepts payment and terminates the mortgage. The calculations on which the fund is based assume immediate payment by the estate of the participant on death, and viability of the fund depends on prompt payment. As an incentive for prompt payments, which is needed to fund distributions to surviving participants, interest is charged from the date of death or possibly, to give the estate of the deceased time to sort out its affairs, from the end of some grace period (e.g., thirty days) after death. Finally, the master file is updated at block 51.

Hardware System

Figure 5:
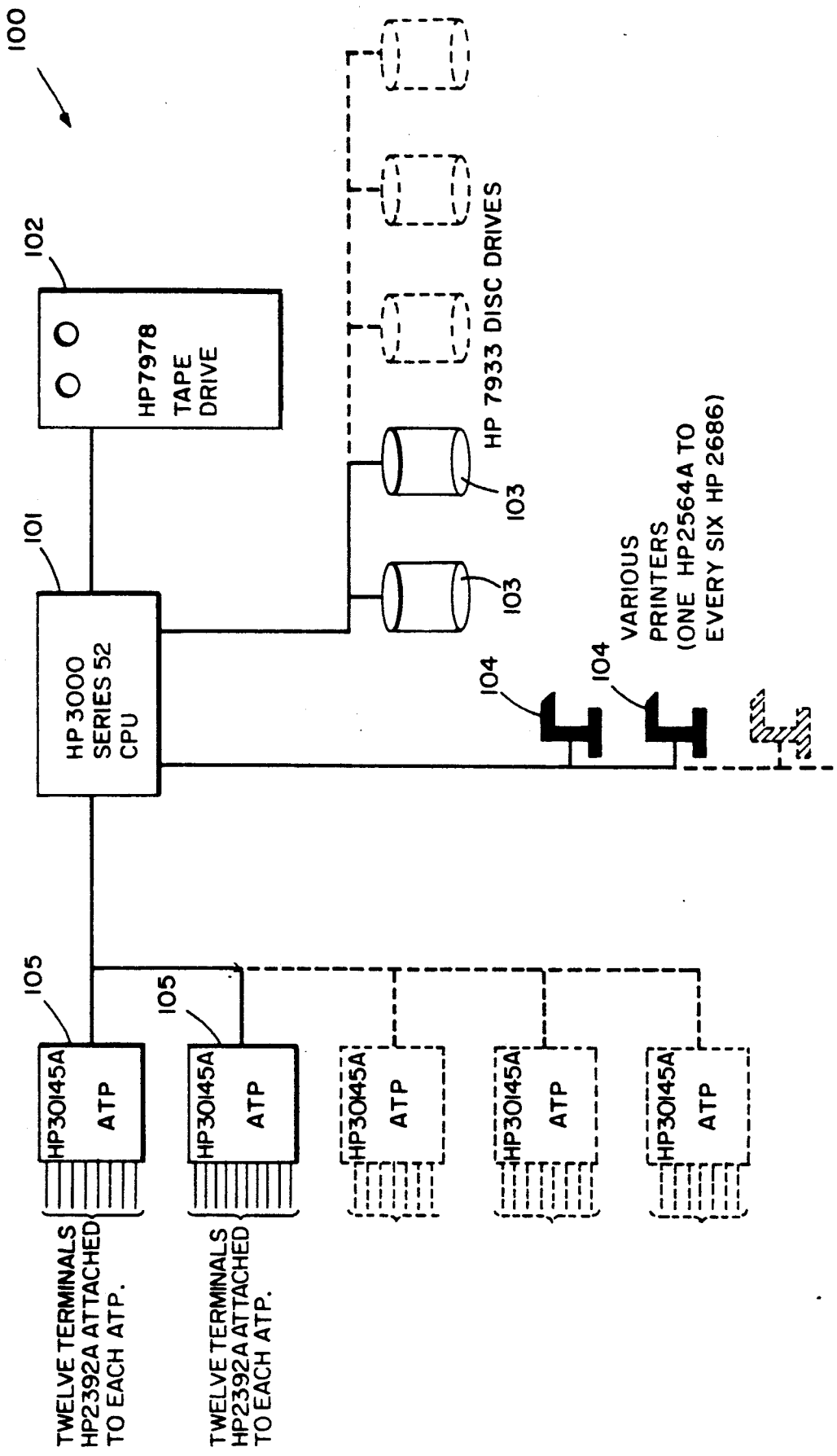
FIG. 5 is a diagram of a hardware system according to the invention.

An exemplary hardware system 100, composed of conventional data processing equipment, for implementing the invention is diagrammed in FIG. 5. The central processor 101 is a Hewlett-Packard HP-3000 Series 52 computer. Mass data storage is provided by at least one HP7978 tape drive unit 102 and a plurality of HP7933 disk drive units 103. A number of printers 104 are attached to the system for generating the mortgages, promissory notes and participation agreements, as well as reports for use by program personnel. For internal reports, a number of HP2564A line printers are provided. For the mortgages, notes, agreements, and other documents for external use, a number of HP2686 letter quality laser printers are provided. The ratio of the number of laser printers to the number of line printers is approximately six-to-one. A plurality of HP30145A ATP (Advanced Terminal Processor) units 105 (not shown) connect the central processor to HP2392A terminals (twelve terminals per ATP) where system personnel perform the produres described above, and other procedures, as necessary.

The Assets

As indicated above, a variety of different assets might be suitable to secure promissory obligations. In some applications (see below) of the invention, only one particular kind of asset may be thought suitable, while for other applications several kinds of assets might be suitable. No matter what assets are used, only some percentage of market value that provides ample security for the fund could be used as the amount of the promissory obligation. Periodic revaluation of the asset allows an increase in its value to be reflected in an increased promissory obligation, and so a larger share in distributions. The same percentage of market value would be maintained to preserve the same margin of safety.

Homes are the most obvious asset because of the large number of home owners in the population and because the mechanics of home mortgages are simple and familiar. Periodic revaluations would allow the increased value of the property to be reflected in an increased promissory obligation, and so an increased share in distributions. Not only homes, but income-producing real estate as well can be an asset under the invention. Assuming that such property is already subject to existing mortgage financing, the invention becomes a method of increasing income from the property based on a secondary mortgage that involves no payment of interest or anything else as long as the owner lives.

Works of art are an attractive asset for the invention because of the greatly increased market value of many items since the time of their acquisition. Many people who own works of art wish to enjoy them for the rest of their lives, but would like to benefit during their lives from the huge appreciation in market value. For those people who plan to leave the work of art to a museum or other public institution, provision can be made for such a gift subject to payment of the promissory obligation by the estate of the owner or by the institution. Once again, periodic revaluations and increased promissory obligations based on an increase in value would increase the owner's share in distributions.

Producing income from precious metals is a continuing challenge to the ingenuity of the financial community, and a store of gold or other precious metal used as an asset according to the invention offers one solution. As with other relatively volatile assets, a choice must be made by the fund between allowing only relatively low percentages of market value as the basis of participation, or allowing somewhat higher percentages with provision for periodic revaluation and adjustment of participant's share to maintain a proper margin of safety. Unlike homes and works of art, the owner is not normally interested in physical possession of a store of precious metal, and safe storage, subject to a legally secure pledge of the metal, is easily accomplished.

Marketable securities would normally be viewed as the equivalent of cash, but in special situations in which retention of the securities is desirable they may be pledged as an asset under the invention, and as such they would present much the same picture as precious metals.

Fully paid life insurance policies that are assignable are an obvious and safe asset for the invention, and offer the advantage of direct collection of proceeds without recourse to the estate of the participant. The possibility of using policies that require further premium payments might be considered to see if there is a worthwhile differential between premium payments and expected distributions under the invention. Insurance policies are not an asset whose value will increase. Death benefits under pension plans, if assignable, could be used as an asset in the same way as life insurance policies.

Applications of the Invention

The most obvious form for the program implemented by the invention is an annuity. Unlike conventional annuities, however, an annuity of this sort requires no relinquishment of money or property before death. It provides substantial additional income for life derived from assets that the annuitant continues to enjoy fully for the rest of his life.

Another use of the program implemented by the invention is as the basis of individual pension schemes. No contributions are necessary, and such a scheme can be commenced while one is still working, or at any time after retirement. Such a pension scheme can of course serve to supplement pension plans that years before seemed adequate provision for retirement but now seem hardly adequate because of the effects of inflation or because of changed circumstances.

Health insurance to cover the financial risks of living to a ripe old age can be paid for by the program implemented by the invention, as can nursing home or home nursing care, again without any diminution of income for the participant. As a participant grows older the distributions to him increase at a high rate because of the increase in the ratio $q'_x/p'_x$ so that even the most expensive medical and nursing care can be paid for almost indefinitely.

The program implemented by the invention may be used as the basis of an interest-free financing scheme. If a participant is allowed to withdraw at some future time, the participant would in effect have paid for the cost of his participation by having run the risk of having his promise performed should he have died before he withdraws. But if he repays the amounts he has received and withdraws after a stipulated time, perhaps with a penalty if withdrawal is quite soon after entry, he will have had an interest-free loan. In principle, even the repayment requirement may be eliminated or modified if amounts distributed and time of required participation are suitably designed to have put the participant at sufficiently great risk of having his promise performed, though considerations of commercial attraction must weigh heavily in such decisions. Allowing such withdrawal would allay a participant's fears that he could never dispose of the asset, or that the equity committed to the fund could not be made available to secure a conventional loan for a lump sum if needed at some time in the future.

Similarly, a participant might wish to sell his house and move elsewhere, for example. If the house is mortgaged to secure his obligation he can still sell the house and substitute a suitable mortgage on a new house, or provide security in some other form using the proceeds of the sale. Similarly, with other kinds of assets which he may wish to dispose of, a participant is not locked into ownership but may make suitable substitutions to secure his obligation and thus remain in the fund.

The program implemented by the invention may serve as the basis of an investment fund requiring no contributions by the participants, but only an accumulation and investment of amounts that would otherwise be distributed periodically. The investment portfolios produced by such accumulations offer the prospect of considerably increased distributions either later while the participant is still alive, or to his estate, or both. It also offers interesting additional opportunities for the fund management acting as investment fund managers.

Thus it is seen that a data processing system and method are provided to implement a program for producing income from assets not normally income-producing. One skilled in the art will appreciate that the present invention can be practiced by other than the embodiments described, which are presented for purposes of illustration and not of limitation, and the present invention is limited only by the claims which follow.

APPENDIX

```
5 GOSUB 1200
10 CLS:PRINT TAB(23);"THE LOCKED ASSET RELEASE PLAN"
20 LOCATE 5,5:PRINT"DO YOU WANT TO:-"
30 LOCATE 8,7:PRINT"A) UPDATE THE MEMBERSHIP FILE."
40 LOCATE 11,7:PRINT"B) CALCULATE THE DISTRIBUTION PAYMENTS FOR THIS YEAR."
45 LOCATE 14,7:PRINT"C) REAPPRAISE AMOUNTS OF PROMISSORY OBLIGATION."
50 I$="ABC":GOSUB 1000:ON I% GOSUB 1500,5000,10000:GOTO 10
900 ' USEFUL SUB-ROUTINES AND FUNCTIONS
1000 LOCATE 22,22:PRINT"INPUT CHOICE AND PRESS RETURN        ":LOCATE 22,51:INP
UT P$:I%=INSTR(I$,P$):IF I%=0 OR P$="" THEN 1000 ELSE LOCATE 22,1:PRINT S$:RETUR
N
1200 DEF FNP(Z#)=INT(Z#*100)/100
1210 S$=SPACE$(78)
1220 DEF FNA(I%,J%,K%)=K%-J%-INT(I%/7)
1230 DIM M(12):RESTORE 1240:FOR A%=1 TO 12:READ M(A%):NEXT
1240 DATA 31,28,31,30,31,30,31,31,30,31,30,31
1250 RETURN
1300 GOSUB 1400:PRINT:RETURN
1400 J%=LEN(STR$(INT(I#)))+4:PRINT USING RIGHT$("###########.##",J%);FNP(I#);:R
ETURN
1410 I%=I%+1:GET #1,I%:IF LEFT$(ID$,1)="&" THEN GOTO 1410 ELSE RETURN
1420 GOSUB 1410:J%=J%-1:IF J%>0 THEN GOTO 1420 ELSE RETURN
1500 ' MFILE UPDATE
1510 OPEN "MFILE" AS #1 LEN=42
1520 FIELD #1,2 AS K$,2 AS L$
1525 GET #1,1
1530 NP%=CVI(K$):NM%=CVI(L$)
1540 FIELD #1,2 AS YE$,2 AS YD$,18 AS ID$,2 AS DD$,2 AS DM$,2 AS DY$,8 AS PO$,4
 AS KV$,2 AS Q$
1550 CLS:LOCATE 3,7:PRINT "THERE ARE ";NM%;" MEMBERS ON FILE AT THE MOMENT."
1560 LOCATE 5,5:PRINT"DO YOU WANT TO:-"
1570 LOCATE 8,7:PRINT"A) PROCESS A NEW APPLICATION."
1580 LOCATE 11,7:PRINT"B) REMOVE THE RECORD OF A DEATH IN MEMBERSHIP."
1590 I$="AB":GOSUB 1000:ON I% GOSUB 1700,2000:CLOSE #1:RETURN
1700 ' NEW APPLICATION
1710 CLS:LOCATE 5,5:PRINT"PLEASE ENTER THE PROSPECTIVE MEMBER'S DETAILS."
1720 LOCATE 8,7:INPUT"NAME - ",A$
1730 LOCATE 11,7:INPUT"DATE OF BIRTH: DAY - ",A%
1732 LOCATE 14,22:INPUT"MONTH - ",B%
1734 LOCATE 17,22:INPUT"YEAR (FOUR FIGURES) - ",C%
1736 IF A%<0 OR B%<1 OR B%>12 THEN GOSUB 9210:GOTO 1730
1738 IF A%>M(B%) THEN GOSUB 9210:GOTO 1730
1740 IF C%<100 THEN GOSUB 9250:GOTO 1734
1750 IF C%<1886 OR C%>1986 THEN GOSUB 9210:GOTO 1730
1751 IF C%>1968 THEN LOCATE 20,5:PRINT"THIS MEMBER IS TOO YOUNG TO BE ACCEPTED."
:GOTO 7100
1752 LOCATE 20,1:PRINT S$
1760 LOCATE 20,7:INPUT"PROMISSORY OBLIGATION OFFERED - ",PO#
1770 LOCATE 23,7:INPUT"CURRENT MARKET VALUE (CMV) OF ASSET CLAIMED - ",V1#
1780 CLS:LOCATE 5,5:PRINT"LARP SHOULD OBTAIN THE FOLLOWING DETAILS."
1790 LOCATE 7,7:INPUT"INDEPENDENT ESTIMATE OF C.M.V. - ";V2#
1800 IF V1#<V2# THEN CMV#=V1# ELSE CMV#=V2#
1810 LOCATE 9,5:PRINT"WHICH OF THE FOLLOWING IS THE ASSET CLOSEST TO IN TYPE?"
1820 OPEN "KFILE" AS #2 LEN=34
1830 FIELD #2,2 AS K$:GET #2,1:M%=CVI(K$):FIELD #2,30 AS K$,4 AS L$
1840 FOR I%=1 TO M%:GET #2,I%+1:LOCATE 10+I%,7:PRINT CHR$(64+I%);") ";K$:NEXT
1850 PRINT TAB(7);CHR$(65+M%);") OTHER"
1860 I$="":FOR I%=1 TO M%+1:I$=I$+CHR$(64+I%):NEXT:GOSUB 1000
1870 IF I%>M% THEN LOCATE 13+M%,5:INPUT"PLEASE ENTER A VALID VALUE FOR K - ",K E
LSE  GET #2,I%+1:K=CVS(L$)
1880 CLOSE #2
1890 CLS:LOCATE 5,5:PRINT"HAS THE APPLICANT'S BIRTH CERTIFICATE BEEN SEEN AND":P
RINT:PRINT TAB(5)"HIS DATE OF BIRTH VERIFIED ? (Y/N)":I$="NY":GOSUB 1000:ON I% G
```

© 1987 Hyman Gross and Melvin John Hatcher
As an unpublished work
All rights reserved

```
OTO 1895,1900
1895 LOCATE 10,5:PRINT"NO APPLICATION CAN BE ACCEPTED WITHOUT SIGHT OF THE BIRTH
     CERTIFICATE.":PRINT:PRINT TAB(5)"THE APPLICANT SHOULD BE ASKED TO REAPPLY ENCLO
SING THE CERTIFICATE.":GOTO 1999
1900 CLS:LOCATE 5,5:INPUT"PLEASE ENTER THE YEAR OF APPLICATION (FOUR FIGURES) -
",YZ
1905 XZ=FNA(BZ,CZ,YZ)
1910 LOCATE 7,5:PRINT"THE APPLICANT'S AGE NEAREST AT 1st JANUARY ";YZ;" IS ";XZ;
".":IF XZ>109 THEN XZ=109
1915 OPEN "MORT" AS #2 LEN=32:FIELD #2,8 AS K$,8 AS L$,8 AS M$:GET #2,XZ:G#=CVD(
M$):CLOSE #2
1916 LOCATE 9,5
1920 IF CMV#*K*1.04*G#>250 GOTO 1926
1925 PRINT"THE APPLICATION IS REJECTED AS THE VALUE OF THE":PRINT:PRINT TAB(5)"A
SSET IS TOO LOW.":GOTO 1999
1926 IF ABS((V1#-V2#)/CMV#)<.2 THEN 1930
1927 PRINT"THERE IS A LARGE DISCREPANCY BETWEEN THE TWO ESTIMATES OF C.M.V.":LOC
ATE 13,5:PRINT"THE APPLICANT SHOULD BE ADVISED TO RECONSIDER HIS ESTIMATE AND":L
OCATE 15,5:PRINT"REAPPLY.":GOTO 1999
1930 IF PO#<CMV#*K THEN GOTO 1940
1935 PRINT"THE PROMISSORY OBLIGATION OFFERED IS TOO HIGH.":GOTO 1951
1940 IF PO#*G#*1.04>250 THEN 1960
1950 PRINT"THE APPLICATION IS REJECTED AS THE PROMISSORY OBLIGATION IS TOO LOW."

1951 PRINT:PRINT TAB(5)"HOWEVER THE APPLICANT SHOULD BE ASKED TO REAPPLY OFFERIN
G A":PRINT:PRINT TAB(5)"PROMISSORY OBLIGATION IN THE RANGE ";
1955 I#=INT(250/(1.04*G#)):GOSUB 1400:PRINT" TO ";:I#=INT(CMV#*K):GOSUB 1400:PR
INT".":GOTO 1999
1960 PRINT"THE APPLICATION IS ACCEPTED.":PRINT:PRINT TAB(5)"THE FOLLOWING ACTION
 SHOULD NOW BE TAKEN :-":PRINT:PRINT TAB(7)"1. PRINT MORTGAGE DOCUMENT":PRINT TA
B(7)"2) PRINT PROMISSORY OBLIGATION DOCUMENT"
1961 PRINT TAB(7)"3) PRINT PARTICIPATION AGREEMENT":PRINT TAB(7)"4) SEND 1,2 AND
 3 TO APPLICANT FOR COMPLETION AND RETURN"
1962 PRINT TAB(7)"5) REGISTER MORTGAGE":PRINT TAB(7)"6) ESTABLISH MECHANISM FOR
DISTRIBUTION PAYMENTS WITH DIRECT BANK":PRINT TAB(10)"DEPOSIT SYSTEM"
1963 PRINT:PRINT TAB(5)"THE APPLICANT WILL BE ENETERED ON THE MEMBERSHIP FILES U
NDER":PRINT TAB(5)"MEMBER NUMBER";NMZ+1
1965 LSET YE$=MKI$(YZ):LSET YD$=MKI$(9999):LSET ID$=A$:LSET DD$=MKI$(AZ):LSET DM
$=MKI$(BZ):LSET DY$=MKI$(CZ):LSET PO$=MKD$(PO#):LSET KV$=MKS$(K):PUT #1,NPZ+2:FI
ELD #1,2 AS K$,2 AS L$:LSET K$=MKI$(NPZ+1):LSET L$=MKI$(NMZ+1):PUT #1,1
1999 LOCATE 23,20:INPUT"(PRESS RETURN)",P$:LOCATE 23,1):PRINT S$:RETURN
2000 CLS ' DEATH IN MEMBERSHIP
2010 GOSUB 8000
2030 IF CVI(YD$)<9999 THEN LOCATE 15,7:PRINT"THIS MEMBER IS REGISTERED AS A DEAT
H IN THE YEAR";CVI(YD$):GOTO 2050
2040 PRINT:PRINT TAB(5)"IS THIS THE RECORD REQUIRED? (Y/N)":I$="YN":GOSUB 1000:O
N IZ GOTO 2060,2050
2050 LOCATE 17,5:PRINT"IT SEEMS YOU HAVE THE INCORRECT POLICY NUMBER.":PRINT:PRI
NT TAB(5)"WOULD YOU LIKE TO TRY AGAIN? (Y/N)":I$="YN":GOSUB 1000:ON IZ GOTO 2000
,2051
2051 RETURN
2060 LOCATE 19,1:PRINT S$:LOCATE 17,5:INPUT"PLEASE ENTER YEAR LAST ANNUITY PAYME
NT IS TO BE MADE ",YZ
2070 IF YZ<1986 THEN LOCATE 19,5:PRINT"BAD DATE":GOTO 2060
2075 EZ=DZ
2080 GET #1,EZ:LSET YD$=MKI$(YZ):PUT #1,EZ:IF CVI(Q$)<>0 THEN EZ=CVI(Q$):GOTO 20
80
2085 LOCATE 21,5:PRINT"THE ABOVE MEMBER HAS NOW BEEN REGISTERED AS A DEATH IN TH
E YEAR";YZ
2090 LOCATE 23,19:INPUT"(PLEASE PRESS RETURN)",P$
3000 CLS:LOCATE 5,5:PRINT"THE FOLLOWING ACTION SHOULD BE TAKEN -"
3010 PRINT:PRINT TAB(7)"CONTACT EXECUTORS OF THE DECEASED PARTICIPANT'S ESTATE T
O CLAIM":PRINT:PRINT TAB(7)"PAYMENT OF PROMISSARY OBLIGATION."
3020 PRINT:PRINT TAB(5)"CAN THE PAYMENT BE MET FROM ASSETS IN THE DECEASED'S EST
```

ATE OTHER":PRINT:PRINT TAB(5)"THAN THAT OVER WHICH THE MORTGAGE WAS TAKEN? (Y/N)
"
3030 I$="YN":GOSUB 1000:LOCATE 11,1:PRINT S$:PRINT:PRINT S$:LOCATE 10,1:ON I% GO
TO 3050,3040
3040 PRINT:PRINT:PRINT TAB(7)"PROCURE SALE OF MORTGAGED ASSET AND CLAIM PAYMENT
(INCLUDING INTEREST":PRINT:PRINT TAB(7)"FROM DATE OF DEATH TO DATE OF PAYMENT) F
ROM PROCEEDS OF THE SALE OF":PRINT:PRINT TAB(7)"THE MORTGAGED ASSET."
3050 PRINT:PRINT:PRINT TAB(7)"TERMINATE MORTGAGE OR OTHER SECURITY DEVICE WHEN P
AYMENT IS MADE."
3060 GOTO 1999
5000 '       YEARLY PAYMENTS CALCULATION
5010 CLS:LOCATE 3,24:PRINT"YEARLY PAYMENTS CALCULATION"
5020 LOCATE 5,5:PRINT"PLEASE ENTER THE FOLLOWING INFORMATION :- "
5030 LOCATE 7,7:PRINT"YEAR (THE FILES WILL BE CALCULATED AS AT 1st JANUARY OF":P
RINT TAB(7)"THIS YEAR AND PAYMENTS CALCULATED WILL BE DUE ON"
5031 LOCATE 9,1:PRINT S$:LOCATE 9,7:INPUT "THIS DATE. PLEASE USE FOUR FIGURES.)
- ",Y%:Y1$="R"+STR$(Y%-1):Y2$="R"+STR$(Y%)
5032 GOSUB 9000:IF I%=0 THEN 5031
5033 IF I%=2 THEN RETURN
5040 PRINT:PRINT TAB(7)"INTEREST RATE (WHICH SHOULD BE A LONG TERM RATE."
5041 LOCATE 12,1:PRINT SPACE$(39);"%":LOCATE 12,7:INPUT "PLEASE INPUT A PERCENTA
GE) - ",I
5042 GOSUB 9100:IF I%=0 THEN 5041 ELSE I=I/100
5050 LOCATE 14,7:PRINT"RESERVES AT 1st JANUARY ";Y%;" (THIS SHOULD INCLUDE ALL A
SSETS":PRINT TAB(7)"HELD BY THE PLAN, INCLUDING INTEREST AND ASSURANCES PAID OVE
R THE":PRINT TAB(7)"PREVIOUS YEAR, BUT IT SHOULD NOT TAKE ACCOUNT OF ANNUITIES D
UE"
5055 PRINT TAB(7)"ON THE 1st JANUARY";Y%:LOCATE 17,32:INPUT ") - ",R#
5060 LOCATE 19,7:INPUT "MANAGERIAL CHARGE AND PROFIT - ",M#
5080 OPEN Y1$ AS #1 LEN=24:FIELD #1,8 AS S1$,8 AS Q1$,8 AS C1$:GET #1,1:N1%=CVD(
S1$)
5090 OPEN "MFILE" AS #2 LEN=42:FIELD #2,2 AS K$:GET #2,1:NP%=CVI(K$):FIELD #2,2
AS YE$,2 AS YD$,18 AS ID$,2 AS DD$,2 AS DM$,2 AS DY$,8 AS PO$,4 AS KV$,2 AS Q$
5280 OPEN "MORT" AS #3 LEN=32:FIELD #3,8 AS K$,8 AS L$,8 AS M$,8 AS N$
5290 V=1/(1+I):F#=0
5300 FOR A%=1 TO 109:N%=110-A%
5310 GET #3,N%
5320 F#=V*(CVD(L$)+F#)
5330 LSET N$=MKD$(F#*(1+I/2)/CVD(K$))
5340 PUT #3,N%
5350 NEXT
5400 ABR#=0:IF N1%=0 THEN 5550
5410 FOR N%=2 TO NP%+1
5420 GET #1,N%:GET #2,N%
5430 IF CVI(YE$)>=Y% OR CVI(YD$)<Y% THEN 5480
5450 X%=FNA(CVI(DM$),CVI(DY$),Y%):IF X%>109 THEN X%=109
5460 GET #3,X%
5470 ABR#=ABR#+(CVD(C1$)-1)*CVD(PO$)*CVD(N$)
5480 NEXT
5550 CLOSE #1
6000 OPEN Y2$ AS #1 LEN=24:FIELD #1,8 AS S2$,8 AS Q2$,8 AS C2$
6010 Q#=0:FOR N%=2 TO NP%+1
6020 GET #2,N%
6030 IF CVI(YE$)>Y% OR CVI(YD$)<Y% THEN S#=0:F#=0:GOTO 6070
6040 X%=FNA(CVI(DM$),CVI(DY$),Y%):IF X%>109 THEN X%=109
6045 IF CVI(YE$)=Y% THEN S#=0:GOTO 6062
6050 GET #3,X%-1
6060 S#=CVD(PO$)*CVD(M$)*1.04
6062 GET #3,X%
6065 F#=CVD(PO$)*CVD(N$)
6070 LSET S2$=MKD$(S#):LSET Q2$=MKD$(F#):Q#=Q#+F#
6080 PUT #1,N%
6090 NEXT
6095 CLOSE #3

```
6100 OPEN Y1$ AS #3 LEN=24:FIELD #3,8 AS S1$,8 AS Q1$,8 AS C1$
6140 S#=0:FOR N%=2 TO NP%+1
6150 GET #1,N%:GET #2,N%:GET #3,N%
6155 IF CVI(YE$)>=Y% OR CVI(YD$)<Y% THEN 6170
6163 LSET S2$=MKD$(CVD(S2$)*CVD(C1$))
6164 S#=S#+CVD(S2$)
6165 PUT #1,N%
6170 NEXT
6172 DP#=R#-ABR#-S#-M#:IF DP#<0 THEN DP#=0
6173 IF Q#=0 THEN B#=1 ELSE B#=DP#/Q#+1
6174 LSET S2$=MKD$(NP%):LSET Q2$=MKD$(Q#):LSET C2$=MKD$(B#):PUT #1,1
6180 FOR N%=2 TO NP%+1
6190 GET #1,N%:GET #2,N%:GET #3,N%
6195 IF CVI(YE$)>Y% OR CVI(YD$)<Y% THEN 6220
6200 IF CVI(YE$)=Y% THEN LSET C2$=MKD$(1) ELSE LSET C2$=MKD$(CVD(C1$)*B#)
6210 PUT #1,N%
6220 NEXT
6230 LOCATE 22,12:INPUT "(PLEASE PRESS RETURN)",P$
6300 CLS:LOCATE 5,5:PRINT"WE CALCULATE THAT :-"
6310 PRINT:PRINT TAB(7)"TOTAL ANNUITIES DUE = ";:I#=S#:GOSUB 1300
6320 PRINT:PRINT TAB(7)"ACCRUED BONUS RESERVE = ";:I#=ABR#:GOSUB 1300
6330 IF Q#=0 THEN PRINT:PRINT"NO ANNUITIES ARE PAYABLE AT THE MOMENT":GOTO 6350
6340 IF DP#>0 THEN PRINT:PRINT:PRINT TAB(5)"HENCE THE DISTRIBUTABLE PROFIT FOR T
HE YEAR";Y%;"IS ";:I#=DP#:GOSUB 1300:PRINT:PRINT TAB(7)"NEW BONUS DECLARABLE I.
E. B(";Y%;") =";INT(100000!*B#)/100000!:GOTO 6350
6342 PRINT:PRINT:PRINT TAB(5)"THE DISTRIBUTABLE PROFIT IS CALCULATED TO BE A NEG
ATIVE FIGURE.":PRINT:PRINT TAB(5)"NO BONUSES WILL BE AWARDED THIS YEAR BUT EXPEC
T A"
6343 PRINT:PRINT TAB(5)"DEFICIT EVEN SO."
6350 CLOSE #1:CLOSE #2:CLOSE #3
6360 LOCATE 23,12:INPUT "(PRESS RETURN FOR LISTING OF ANNUITIES DUE)",P$:GOSUB 7
000:RETURN
7000 ' VIEWING PROCEDURES
7010 CLS:Y$="R"+STR$(Y%)
7020 OPEN "MFILE" AS #1 LEN=42:FIELD #1,2 AS YE$,2 AS YD$,18 AS ID$,18 AS D$,2 A
S Q$
7025 GET #1,1:NM%=CVI(YD$)
7030 OPEN Y$ AS #2 LEN=24:FIELD #2,8 AS K$,8 AS L$,8 AS M$
7040 GET #2,1:NP%=CVD(K$):B#=CVD(M$):IF NP%=0 THEN LOCATE 5,5:PRINT"THERE ARE NO
 RECORDS FOR THIS YEAR":GOTO 7100
7050 LOCATE 5,7:PRINT"NAME                        ANNUITY DUE ON       ACCRUED BO
NUS FACTOR USED":PRINT TAB(7)"                              1st JANUARY";Y%;"
   I.E. C(";Y%-1;")"
7055 PRINT TAB(40)""
7056 D%=1
7060 FOR A%=1 TO NM%
7061 B%=0:I%=D%:GOSUB 1410:D%=I%:E%=I%
7062 B%=B%+1:GET #1,E%:GET #2,E%
7063 IF CVI(YE$)>Y% THEN GOTO 7110
7064 IF LEFT$(ID$,1)="&" THEN P$=SPACE$(20) ELSE P$=ID$+SPACE$(20-LEN(ID$))
7065 PRINT TAB(6);P$;
7080 IF CVI(YD$)<Y% THEN PRINT"        DEATH IN MEMBERSHIP":GOTO 7120
7083 IF CVI(Q$)=0 AND LEFT$(ID$,1)<>"&" THEN PRINT"           ";:GOTO 7085
7084 PRINT B%;")       ";
7085 IF CVI(YE$)=Y% THEN PRINT" NIL":GOTO 7110
7100 I#=CVD(K$):GOSUB 1400:PRINT SPACE$(26-J%);INT(100000!*CVD(M$)/B#)/100000!
7110 IF CVI(Q$)<>0 THEN E%=CVI(Q$):GOTO 7062
7120 NEXT
7400 CLOSE #1:CLOSE #2:LOCATE 23,23:INPUT"(PLEASE PRESS RETURN)",P$:RETURN
8000 ' READ MEMBER FILE
8010 CLS:LOCATE 5,5:INPUT "PLEASE ENTER THE MEMBER NUMBER OF THE MEMBER REQUIRED
 - ",D%:LOCATE 10,1:PRINT S$:IF D%<1 OR D%>NM% THEN CLS:LOCATE 10,5:PRINT"THIS M
UST BE A NUMBER BETWEEN 1 AND";NM%:LOCATE 23,24:INPUT"(PLEASE PRESS RETURN)",P$:
GOTO 8010
```

```
8015 CLS:IZ=1:JZ=DZ:GOSUB 1420:DZ=IZ
8020 GET #1,DZ:A$=ID$:AZ=CVI(DD$):BZ=CVI(DM$):CZ=CVI(DY$)
8030 LOCATE 3,5:PRINT"THE MEMBERS DETAILS HELD UNDER THIS NUMBER ARE :-":PRINT:P
RINT TAB(7)"NAME            : ";A$:PRINT:PRINT TAB(7)"DATE OF BIRTH    : ";A
Z;"/";BZ;"/";CZ:PRINT:PRINT TAB(30)"AMOUNT         YEAR MADE":PRINT
8040 EZ=DZ:AZ=0
8045 AZ=AZ+1:GET #1,EZ
8046 IF AZ=1 THEN P$="OBLIGATION " ELSE P$=SPACE$(11)
8050 PRINT TAB(7);P$;AZ;")   : ";:I#=CVD(PO$):GOSUB 1400:PRINT SPACE$(23-JZ);CVI
(YE$)
8060 IF CVI(Q$)<>0 THEN EZ=CVI(Q$):GOTO 8045
8070 RETURN
8999 ' ERROR CHECKS FOR YEARLY RUN DATA
9000 IF YZ<1980 OR YZ>2500 THEN LOCATE 11,10:PRINT"BAD DATE":IZ=0:RETURN ELSE IZ
=1
9010 OPEN Y1$ AS #1:FIELD #1,8 AS K$,8 AS L$,8 AS M$:GET #1,1:N1Z=CVD(K$):CLOSE
#1
9020 OPEN Y2$ AS #1:FIELD #1,8 AS K$,8 AS L$,8 AS M$:GET #1,1:N2Z=CVD(K$):CLOSE
#1
9030 IF N1Z=0 THEN KILL Y1$:IF N2Z=0 THEN KILL Y2$
9031 OPEN"MFILE" AS #1 LEN=42:FIELD #1,2 AS K$:GET #1,1:NPZ=CVI(K$):FIELD #1,2 A
S YE$,2 AS YD$,18 AS ID$,2 AS DD$,2 AS DM$,2 AS DY$,8 AS PO$,4 AS KV$
9032 M1Z=0:M2Z=0:FOR AZ=2 TO NPZ+1:GET #1,AZ
9033 IF CVI(YE$)<=YZ-1 THEN M1Z=AZ
9034 IF CVI(YE$)<=YZ THEN M2Z=AZ
9035 NEXT:M1Z=M1Z-1:M2Z=M2Z-1:CLOSE #1
9036 IF M1Z<0 THEN M1Z=0
9037 IF M2Z<0 THEN M2Z=0
9040 IF N1Z>=M1Z AND N2Z=0 AND M2Z>0 THEN RETURN
9059 IF M2Z=0 THEN PRINT:PRINT TAB(7)"THERE ARE NO MEMBERS RECORDED FOR THIS YEA
R":IZ=2:LOCATE 23,12:INPUT"(PLEASE PRESS RETURN)",P$:GOTO 9091
9060 IF N1Z<M1Z THEN PRINT:PRINT TAB(7)"THERE ARE INSUFFICIENT RECORDS FOR THE Y
EAR";YZ-1:IZ=2:LOCATE 23,12:INPUT"(PLEASE PRESS RETURN)",P$:GOTO 9091
9061 LOCATE 11,15:PRINT"**** WARNING ****"
9070 IF N2Z>0 THEN PRINT:PRINT TAB(7)"THERE ARE RECORDS FOR YEAR";YZ;"THAT WILL
BE LOST IF YOU CONTINUE"
9080 PRINT:PRINT TAB(7)"DO YOU WISH TO CONTINUE? (Y/N)"
9090 I$="YN":GOSUB 1000
9091 FOR AZ=11 TO 17 STEP 2:LOCATE AZ,1:PRINT S$:NEXT:LOCATE 10,1:RETURN
9100 IZ=1:IF I<1 THEN PRINT:PRINT TAB(7)"THIS IS VERY LOW FOR A PERCENTAGE FIGUR
E. ARE YOU SURE? (Y/N)":I$="NY":GOSUB 1000:LOCATE 14,1:PRINT S$:IZ=IZ-1:RETURN
9110 RETURN
9210 LOCATE 20,5:PRINT"INVALID DATE, PLEASE ENTER AGAIN."
9220 FOR IZ=11 TO 17 STEP 3:LOCATE IZ,1:PRINT S$:NEXT
9230 RETURN
9250 LOCATE 17,1:PRINT S$:LOCATE 20,5:PRINT"PLEASE USE FOUR FIGURE DATES.   ":R
ETURN
10000 'REAPPRAISAL ROUTINE
10010 OPEN"MFILE" AS #1 LEN=42:FIELD #1,2 AS K$,2 AS L$:GET #1,1:NPZ=CVI(K$):NMZ
=CVI(L$):FIELD #1,2 AS YE$,2 AS YD$,18 AS ID$,2 AS DD$,2 AS DM$,2 AS DY$,8 AS PO
$,4 AS KV$,2 AS Q$
10020 GOSUB 8010
10030 PRINT:PRINT TAB(5)"ARE THESE THE DETAILS OF THE MEMBER CONCERNED ? (Y/N)":
I$="YN":GOSUB 1000:ON IZ GOTO 10050,10040
10040 LOCATE 19,5:PRINT"IT APPEARS YOU HAVE THE INCORRECT MEMBER NUMBER. DO YOU
WISH TO":PRINT:PRINT TAB(5)"TRY AGAIN? (Y/N)":I$="YN":GOSUB 1000:ON IZ GOTO 1002
0,10045
10044 LOCATE 23,20:INPUT"(PLEASE PRESS RETURN)",P$
10045 CLOSE:RETURN
10050 CLS:LOCATE 4,7:PRINT"PLEASE ENTER A RECENT INDEPENDENT FIGURE FOR THE CURR
ENT MARKET":LOCATE 6,7:INPUT"VALUE OF THE MORTGAGED ASSET -",CM V#
10052 PO#=0:EZ=DZ
10054 GET #1,EZ:PO#=PO#+CVD(PO$)
10056 IF CVI(Q$)<>0 THEN EZ=CVI(Q$):GOTO 10054
```

```
10058 GET #1,DX
10060 IF CHV#>PO#/CVS(KV$) THEN GOTO 10080
10070 LOCATE 9,7:PRINT"THE PARTICIPANT SHOULD BE ADVISED THAT EITHER THE PROMISS
ORY":PRINT:PRINT TAB(7)"OBLIGATION MUST BE REDUCED OR FURTHER ASSETS MORTGAGED."
:GOTO 10044
10080 LOCATE 9,7:PRINT"THE PARTICIPANT SHOULD BE ADVISED THAT THE PROMISSORY OBL
IGATION COULD":PRINT:PRINT TAB(7)"BE INCREASED TO AS MUCH AS ";:I#=INT(CHV#*CVS
(KV$)):GOSUB 1400:PRINT" IF SO DESIRED."
10090 LOCATE 14,7:PRINT"DOES THE PARTICIPANT WISH TO INCREASE HIS OBLIGATION? (Y
/N)":I$="YN":GOSUB 1000:ON IX GOTO 10110,10100
10100 LOCATE 16,7:PRINT"THE CURRENT SCHEDULE OF DISTRIBUTIONS WILL BE MAINTAINED
.":GOTO 10044
10110 LOCATE 14,1:PRINT S$:LOCATE 14,7:INPUT"PLEASE ENTER THE REVISED PROMISSORY
 OBLIGATION ",NV#:IF NV#<PO# OR NV#>CHV#*CVS(KV$) THEN GOTO 10120 ELSE GOTO 101
30
10120 LOCATE 16,7:PRINT"THIS MUST BE IN THE RANGE ";:I#=INT(PO#):GOSUB 1400:PRI
NT" TO ";:I#=INT(CHV#*CVS(KV$)):GOSUB 1400:PRINT".":GOTO 10110
10130 LOCATE 16,1:PRINT S$:PRINT:PRINT S$:PRINT:PRINT S$:LOCATE 16,7:INPUT"PLEAS
E ENTER THE YEAR OF THE REAPPRAISAL - ",YX
10140 IF YX<100 THEN LOCATE 19,1:PRINT S$:LOCATE 19,7:PRINT"PLEASE USE FOUR FIGU
RES":GOTO 10130
10141 IF YX<1980 OR YX>2100 THEN LOCATE 19,1:PRINT S$:LOCATE 19,7:PRINT"BAD DATE
":GOTO 10130
10142 LOCATE 19,1:PRINT S$
10143 IF YX<CVI(YE$) THEN LOCATE 18,1:PRINT S$:LOCATE 18,7:PRINT"THE MEMBER DID
NOT JOIN UNTIL ";CVI(YE$):LOCATE 20,7:PRINT"DO YOU WISH TO TRY AGAIN? (Y/N)":I$=
"YN":GOSUB 1000:ON IX GOTO 10130,10045
10144 IF YX>=CVI(YD$) THEN LOCATE 18,1:PRINT S$:LOCATE 18,7:PRINT"THE MEMBER DIE
D IN ";CVI(YD$):LOCATE 20,7:PRINT"DO YOU WISH TO TRY AGAIN? (Y/N)":I$="YN":GOSUB
 1000:ON IX GOTO 10130,10220
10160 CLS:LOCATE 7,7:PRINT"THE ADDITIONAL MORTGAGE WILL NOW BE TREATED AS IF IT
WERE A FRESH":PRINT:PRINT TAB(7)"PROMISSORY OBLIGATION MADE AT THE DATE OF REAPP
RAISAL."
10170 LOCATE 12,7:PRINT"THE NECESSARY DOCUMENTS FOR INCREASING THE PROMISSORY OB
LIGATION":PRINT:PRINT TAB(7)"SHOULD BE SUBMITTED TO THE PARTICIPANT FOR COMPLETI
ON AND RETURN."
10180 NV#=NV#-PO#
10190 GET #1,EX:LSET Q$=MKI$(NPX+2):PUT #1,EX
10200 GET #1,DX:LSET ID$="&":LSET PO$=MKD$(NV#):LSET YE$=MKI$(YX):LSET Q$=MKI$(0
):PUT #1,NPX+2
10210 GET #1,1:LSET YE$=MKI$(CVI(YE$)+1):PUT #1,1
10220 CLOSE #1:LOCATE 23,23:INPUT"(PLEASE PRESS RETURN)",P$:RETURN
```

What is claimed is:

1. A data processing system for administering a program for releasing to an owner of an asset at least a portion of its cash value without transfer of ownership of said asset and without transfer of control thereof, said system determining eligibility for said program and determining program payouts, said system comprising:

means for entering application data derived from an application by said owner to participate in said program, said application data including date of birth of said owner, an amount of a promissory obligation to be offered for participation in said program, and an estimate by said owner of current market value of said asset;

means for determining the probability of death of said owner during any particular year based on said date of birth;

means for determining, based on said current market value and said probability, whether said asset will support a predetermined minimum distribution of cash and for rejecting said application if said asset has insufficient value to support said minimum distribution;

means for generating a mortgage document against said asset and a promissory note to be signed by said owner, said promissory note being in the amount of said promissory obligation, being secured by said mortgage, and being payable on death of said owner;

means for computing and making periodic distributions to participating owners based on the current probability of death and the amount of the promissory obligation of each owner;

means for entering the death of said owner;

means for notifying program personnel to procure payment of said promissory obligation from the estate of said owner and, if said estate cannot otherwise settle said promissory obligation, to procure sale of said asset and reimbursement from the proceeds thereof; and means for terminating said mortgage on receipt of said payment, whereby:

said owner retains ownership and control of said asset during his lifetime, while value of said asset is available to him as cash.

2. The data processing system of claim 1 further comprising means for comparing said estimate of current market value to an independent appraisal of current market value and for rejecting said application if there is a discrepancy between said estimate and said appraisal exceeding a predetermined plausible percentage of said appraisal.

3. The data processing system of claim 1 further comprising means for comparing said promissory obligation offered to the product of said current market value and a proportionality factor, said proportionality factor chosen from a list of proportionality factors according to type of asset and representing the smallest fraction of current market value normally likely to be achieved because of price fluctuations of said asset over the life of said owner, and for rejecting said application if said promissory obligation exceeds said product, whereby on the death of said owner said asset is likely to have sufficient value to settle said promissory obligation.

4. The data processing system of claim 1 further comprising means for determining, based on said current market value and said probability, whether said promissory obligation will support said predetermined minimum periodic distribution of cash, and for rejecting said application if said promissory obligation is insufficient to support said predetermined minimum distribution.

5. The data processing system of claim 1 wherein said periodic distribution computing and making means additionally bases said distributions on distributable profits of said program.

6. The data processing system of claim 5 wherein said distributable profits are distributed to each participating asset owner based on a pro rata share determined by a ratio that capitalized value of his asset bears to a total capitalized value of all participating assets.

7. The data processing system of claim 1 further comprising means for periodically comparing a reassessed current market value of said asset to the amount of said promissory obligation and, if said current market value has increased, for generating a notice to said owner that said amount may be increased, and, if said current market value has decreased, for generating a notice to said owner that he must do one of (1) reducing said amount of said promissory obligation, and (2) mortgaging additional assets.

8. The data processing system of claim 7 further comprising means for generating a new promissory note and a new mortgage when said promissory obligation is changed.

9. A data processing method for administering a program for releasing to an owner of an asset at least a portion of its cash value without transfer of ownership of said asset and without transfer of control thereof, said method determining eligibility for said program and determining program payouts, said method comprising the steps of:

entering application data derived from an application by said owner to participate in said program, said application data including date of birth of said owner, an amount of a promissory obligation to be offered for participation in said program, and an estimate by said owner of current market value of said asset;

determining probability of death of said owner during any particular year based on said date of birth;

determining, based on said current market value and said probability, whether said asset will support a predetermined minimum periodic distribution of cash and rejecting said application if said asset has insufficient value to support said minimum periodic distribution;

comparing said estimate of current market value to an independent appraisal of current market value and rejecting said application if there is a discrepancy between said estimate and said appraisal exceeding a predetermined plausible percentage of said appraisal;

comparing said promissory obligation offered to the product of said current market value and a proportionality factor chosen from a list of proportionality factors according to type of asset and representing the smallest fraction of current market value normally likely to be achieved because of price fluctuations of said asset over the life of said owner, and rejecting said application if said promissory obligation exceeds said product, whereby on the death of said owner said asset is likely to have sufficient value to settle said promissory obligation;

determining, based on said current market value and said probability, whether said promissory obligation will support said minimum periodic distribution of cash, and rejecting said application if said promissory obligation is insufficient to support said predetermined minimum distribution;

generating a mortgage document against said asset and a promissory note to be signed by said owner, said promissory note being in the amount of said promissory obligation, being secured by said mortgage, and being payable on death of said owner;

computing and making periodic distributions to participating owners based on the current probability of death of said owners, the amount of the promissory obligation given by each owner, and distributable profits of said program, wherein said distributable profits are distributed to each participating asset owner based on a pro rata share determined by a ratio that capitalized value of the asset bears to a total capitalized value of all participating assets;

periodically comparing a reassessed current market value of said asset to the amount of said promissory obligation and, if said current market value has increased, generating a notice to said owner that said amount may be increased, and, if said current market value has decreased, generating a notice to said owner that he must do one of (1) reducing said amount of said promissory obligation, and (2) mortgaging additional assets, and generating a new promissory note and a new mortgage when said promissory obligation is changed;

entering the death of said owner;

notifying program personnel to procure payment of said promissory obligation from the estate of said owner and, if said estate cannot otherwise settle said promissory obligation, to procure sale of said asset;

computing interest from date of death to date of receipt of payment from one of (1) said estate, and (2) sale of said asset; and terminating said mortgage on receipt of said payment and said interest.

10. A data processing system for administering a program for releasing to an owner of an asset at least a portion of its cash value without transfer of ownership of said asset and without transfer of control thereof, said system determining eligibility for said program and determining program payouts, said system comprising:

means for entering application data derived from an application by said owner to participate in said program, said application data including date of birth of said owner, an amount of a promissory obligation to be offered for participation in said program, and an estimate by said owner of current market value of said asset;

means for determining probability of death of said owner during any particular year based on said date of birth;

means for determining, based on said current market value and said probability, whether said asset will support a predetermined minimum periodic distribution of cash and for rejecting said application if said asset has insufficient value to support said minimum periodic distribution;

means for comparing said estimate of current market value to an independent appraisal of current market value and for rejecting said application if there is a discrepancy between said estimate and said appraisal exceeding a predetermined plausible percentage of said appraisal;

means for comparing said promissory obligation offered to the product of said current market value and a proportionality factor chosen from a list of proportionality factors according to type of asset and representing the smallest fraction of current market value normally likely to be achieved because of price fluctuations of said asset over the life of said owner, and for rejecting said application if said promissory obligation exceeds said product, whereby on the death of said owner said asset is likely to have sufficient value to settle said promissory obligation;

means for determining, based on said current market value and said probability, whether said promissory obligation will support said minimum periodic distribution of cash, and for rejecting said application if said promissory obligation is insufficient to support said predetermined minimum distribution;

means for generating a mortgage document against said asset and a promissory note to be signed by said owner, said promissory note being in the amount of said promissory obligation, being secured by said mortgage, and being payable on death of said owner;

means for computing and making periodic distributions to participating owners based on the current probability of death of said owners, the amount of the promissory obligation given by each owner, and distributable profits of said program, wherein said distributable profits are distributed to each participating asset owner based on a pro rata share determined by a ratio that capitalized value of the asset bears to a total capitalized value of all participating assets;

means for periodically comparing a reassessed current market value of said asset to the amount of said promissory obligation and, if said current market value has increased, for generating a notice to said owner that said amount may be increased, and, if said current market value has decreased, for generating a notice to said owner that he must do one of (1) reducing said amount of said promissory obligation, and (2) mortgaging additional assets, and for generating a new promissory note and a new mortgage when said promissory obligation is changed;

means for entering the death of said owner;

means for notifying program personnel to procure payment of said promissory obligation from the estate of said owner and, if said estate cannot otherwise settle said promissory obligation, to procure sale of said asset;

means for computing interest from date of death to date of receipt of payment from one of (1) said estate, and (2) sale of said asset; and means for terminating said mortgage on receipt of said payment and said interest.

11. A data processing method for administering a program for releasing to an owner of an asset at least a portion of its cash value without transfer of ownership of said asset and without transfer of control thereof, said method determining eligibility for said program and determining program payouts, said method comprising the steps of:

entering application data derived from an application by said owner to participate in said program, said application data including date of birth of said owner, an amount of a promissory obligation to be offered for participation in said program, and an estimate by said owner of current market value of said asset;

determining the probability of death of said owner during any particular year based on said date of birth;

determining, based on said current market value and said probability, whether said asset will support a predetermined minimum distribution of cash and rejecting said application if said asset has insufficient value to support said minimum periodic distribution;

generating a mortgage document against said asset and a promissory note to be signed by said owner, said promissory note being in the amount of said promissory obligation, being secured by said mortgage, and being payable on death of said owner; and computing and making periodic distributions to participating owners based on the current probability of death and the amount of the promissory obligation of each owner;

entering the death of said owner;

notifying program personnel to procure payment of said promissory obligation from the estate of said owner and, if said estate cannot otherwise settle said promissory obligation, to procure sale of said asset and reimbursement from the proceeds thereof; and terminating said mortgage on receipt of said payment, whereby:

said owner retains ownership and control of said asset during his lifetime, while value of said asset is available to him as cash.

12. The data processing method of claim 11 further comprising comparing said estimate of current market value to an independent appraisal of current market value and rejecting said application if there is a discrepancy between said estimate and said appraisal exceeding a predetermined plausible percentage of said appraisal.

13. The data processing method of claim 11 further comprising comparing said promissory obligation offered to the product of said current market value and a proportionality factor, said proportionality factor chosen from a list of proportionality factors according to type of asset and representing the smallest fraction of current market value normally likely to be achieved because of price fluctuations of said asset over the life of said owner, and rejecting said application if said promissory obligation exceeds said product, whereby on the death of said owner said asset is likely to have sufficient value to settle said promissory obligation.

14. The data processing method of claim 11 further comprising determining, based on said current market value and said probability, whether said promissory obligation will support said predetermined minimum periodic distribution of cash, and rejecting said application if said promissory obligation is insufficient to support said predetermined minimum distribution.

15. The data processing method of claim 11 wherein said periodic distribution computing and making step additionally bases said distributions on distributable profits of said program.

16. The data processing method of claim 15 wherein said distributable profits are distributed to each participating asset owner based on a pro rata share determined by a ratio that capitalized value of his asset bears to a total capitalized value of all participating assets.

17. The data processing method of claim 11 further comprising periodically comparing a reassessed current market value of said asset to the amount of said promissory obligation and, if said current market value has increased, generating a notice to said owner that said amount may be increased, and, if said current market value has decreased, generating a notice to said owner that he must do one of (1) reducing said amount of said promissory obligation, and (2) mortgaging additional assets.

18. The data processing method of claim 17 further comprising generating a new promissory note and a new mortgage when said promissory obligation is changed.

* * * * *